United States Patent
Utz et al.

(10) Patent No.: US 8,006,018 B2
(45) Date of Patent: Aug. 23, 2011

(54) SYSTEM AND METHOD TO STACK AN OPEN NAND FLASH INTERFACE MODULE OVER A MINICARD

(75) Inventors: James R. Utz, Round Rock, TX (US); Andrew T. Sultenfuss, Leander, TX (US)

(73) Assignee: Dell Products, LP, Round Rock, TX (US)

( * ) Notice: Subject to any disclaimer, the term of this patent is extended or adjusted under 35 U.S.C. 154(b) by 7 days.

(21) Appl. No.: 12/510,031

(22) Filed: Jul. 27, 2009

(65) Prior Publication Data

US 2011/0022761 A1    Jan. 27, 2011

(51) Int. Cl.
*G06F 13/00* (2006.01)
*H05K 7/10* (2006.01)

(52) U.S. Cl. .................. 710/301; 710/104; 710/300

(58) Field of Classification Search .............. 710/301, 710/104, 300
See application file for complete search history.

(56) References Cited

U.S. PATENT DOCUMENTS

| | | | |
|---|---|---|---|
| 7,491,078 B2 * | 2/2009 | Little et al. ............. | 439/260 |
| 2006/0264085 A1 | 11/2006 | Kwatra et al. | |
| 2008/0101051 A1 | 5/2008 | Middleton et al. | |
| 2008/0168204 A1 | 7/2008 | Sultenfuss et al. | |

OTHER PUBLICATIONS

Open NAND Flash Interface Specification: NAND Connector; Connector Revision 1.0; Apr. 23, 2008; Hynix Semiconductor et al.*
PCI Express Mini Card Electromechanical Specification Revision 1.2; Oct. 26, 2007; PCI Express.*

* cited by examiner

*Primary Examiner* — Mark Rinehart
*Assistant Examiner* — Jeremy S Cerullo
(74) *Attorney, Agent, or Firm* — Larson Newman, LLP

(57) ABSTRACT

A system includes a minicard host connector and an open NAND flash interface host connector. The minicard host connector is configured to receive a minicard. The open NAND flash interface host connector is in physical communication with the minicard host connector and configured to receive an open NAND flash interface card. The open NAND flash interface host connector includes first and second retention arms extending from opposite ends of the open NAND flash interface host connector. The open NAND flash interface host connector is sufficiently wide for the minicard host connector to fit between the first and second retention arms.

18 Claims, 4 Drawing Sheets

SYSTEM AND METHOD TO STACK AN OPEN NAND FLASH INTERFACE MODULE OVER A MINICARD

FIELD OF DISCLOSURE

This disclosure relates generally to information handling systems, and more particularly relates to a system to stack an open NAND flash interface module over a minicard.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

There are a number of different types of memory cards and/or devices that can be connected to an information handling system, such as a minicard, an open NAND flash interface (ONFI) card, a universal serial bus (USB) memory, and the like. Each type of card and/or device needs a connector to provide communication between the card and the motherboard of the information handling system. The cards and connectors usually require specific footprints or areas on the motherboard.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application.

Figure 1:
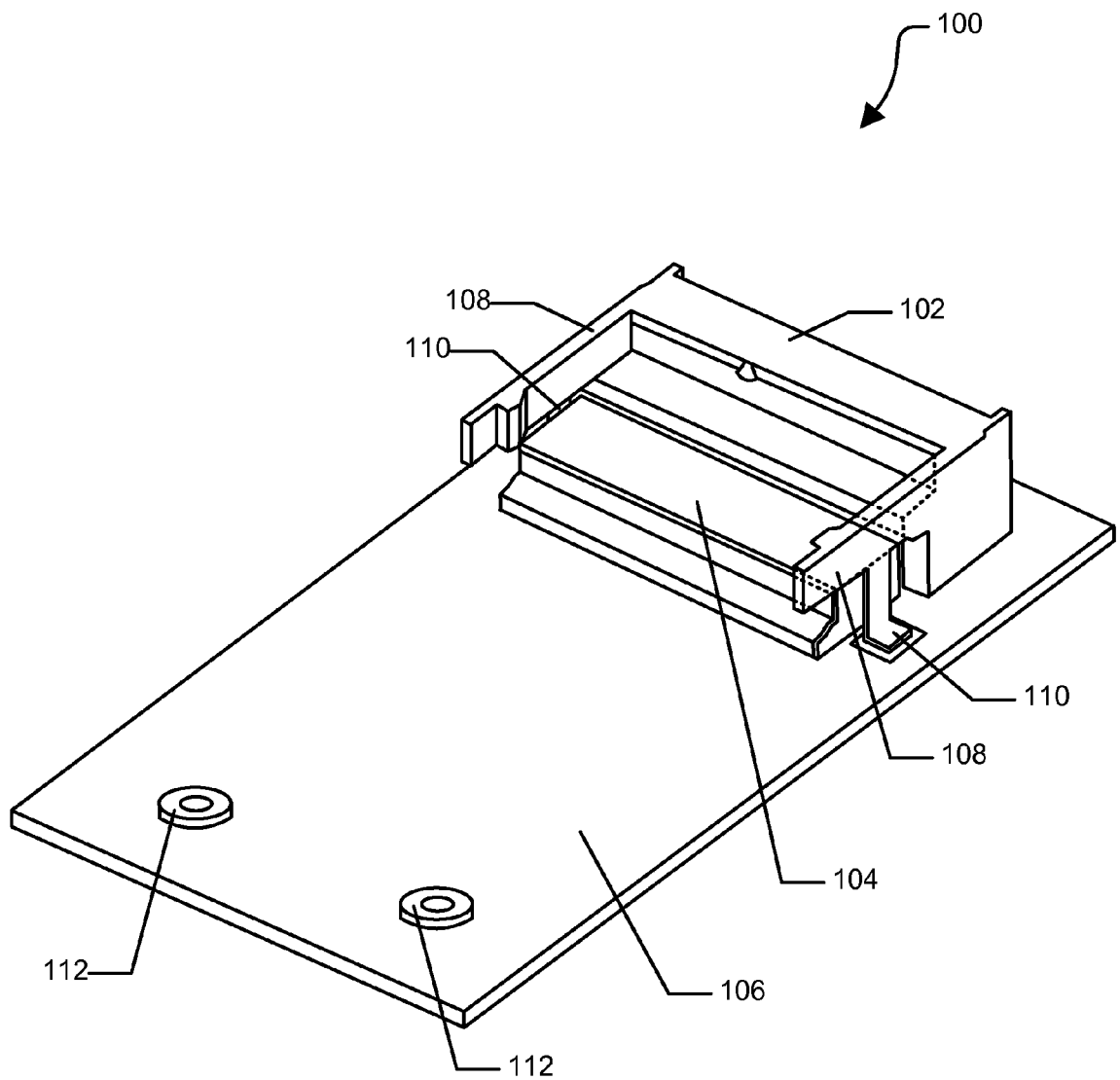
FIG. 1 is a perspective view of a stacked dual connector system.
Figure 2:
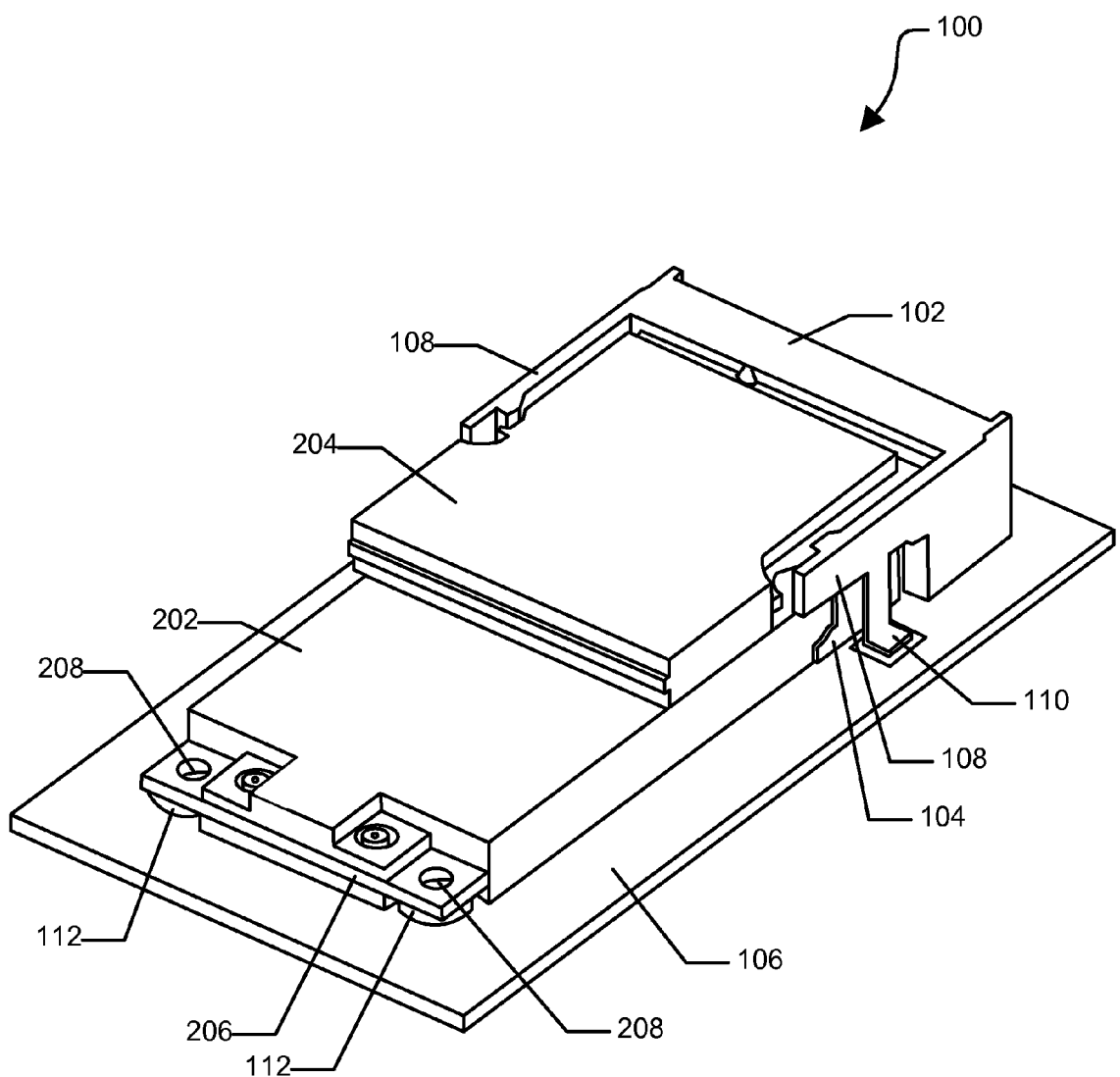
FIGS. 2 and 3 are additional perspective views of the stacked dual connector system with a minicard and an open NAND flash interface card connected to the stacked dual connector system.
Figure 3:
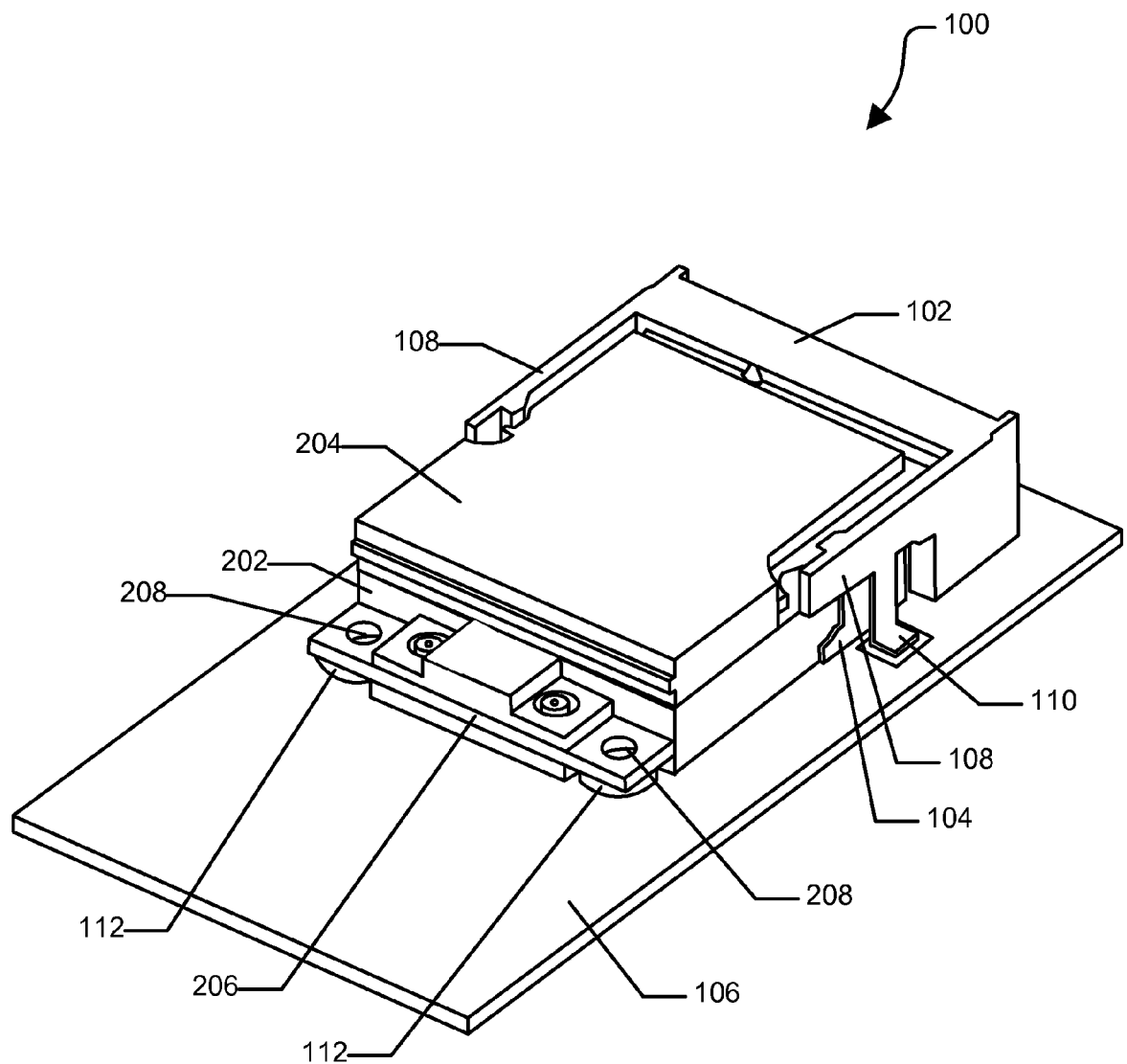

FIGS. 1-3 show a stacked dual connector host system 100 of an information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

The stacked dual connector host system 100 includes an open NAND flash interface (ONFI) host connector 102, a minicard host connector 104, and a motherboard 106. The minicard host connector 104 is preferably connected to the motherboard 106 in the conventional manner, such that the minicard host connector is connected directly on the motherboard. The ONFI host connector 102 is preferably connected to the motherboard 106 behind the minicard host connector 104. The ONFI host connector 102 includes retention arms 108 and solder tabs 110. The retention arms 108 extend forward from the ONFI host connector 102 toward the minicard host connector 104. The retention arms 108 are sufficiently wide for the minicard host connector 104 to fit between the retention arms. The solder tabs 110 extend downward from the retention arms 108 along the minicard host connector 104 and connect to the motherboard 106 on the outer edge of the minicard host connector. The motherboard 106 includes mounting bosses 112 which are used to connect a minicard 202 to the motherboard, discussed below in FIG. 2.

In an embodiment, the minicard host connector 104 is 30 mm wide, and a distance between the retention arms 108 is greater than 30 mm. In an embodiment, the minicard host connector 104 has a height of 4 mm. In another embodiment, the minicard host connector 104 has a height of 4.5 mm. The ONFI host connector 102 preferably extends up from the motherboard 106 such that the ONFI host connector is above the minicard host connector 104.

Turning to FIGS. 2 and 3, the minicard 202 can be connected to the minicard host connector 104, and an ONFI card 204 can be connected to ONFI host connector 102, as discussed below. The minicard 202 includes a minicard mount 206 which in turn includes mounting holes 208. The minicard 202 can be a communication device, a memory device, and the like that is preferably configured to be received within the minicard host connector 104. The minicard 202 preferably has specific dimensions, number of pins, and the like that are different than a conventional interface card. For example, the minicard 202 can preferably have a width that is smaller than a conventional interface card. The ONFI card 204 preferably includes a NAND flash memory chip to provide an information handling system with additional data storage. The ONFI card 204 is preferably configured to be received within the ONFI host connector 102.

The minicard 202 is preferably inserted between the retention arms 108 and into the minicard host connector 104 at about a thirty degree angle to the motherboard 106. Upon the minicard 202 engaging the minicard host connector 104, the minicard can be pressed downward toward the motherboard 106 until the minicard mount 206 is preferably placed in physical communication with the mounting bosses 112, and the mounting holes 208 are preferably aligned with the mounting bosses 112 located on the motherboard 106. The minicard 202 can be thereby secured to the motherboard 106 via screws being inserted through the mounting holes 208 and into the mounting bosses 112.

Upon the minicard 202 being inserted within the minicard host connector 104, the ONFI card 204 can be inserted within the ONFI host connector 102. The ONFI card 204 is preferably placed at a thirty degree angle with the motherboard 106 as the ONFI card is first engaged with the ONFI host connector 102. As ONFI card 204 is pressed downward, the ONFI card can be completely inserted into the ONFI host connector 102, such that the ONFI card is placed in physical communication with the minicard 202 and the minicard host connector 104. In an embodiment, the ONFI host connector 102 connection for the ONFI card 204 has a height greater than 4 mm. In another embodiment, the ONFI host connector 102 connection for the ONFI card 204 has a height greater than 4.5 mm. In an embodiment, the minicard 202 can be a standard minicard having a length of 50.95 mm as shown in FIG. 2. In another embodiment, the minicard 202 can be a half-size minicard having a length of 26.8 mm as shown in FIG. 3. If the minicard 202 is the half-size minicard, the mounting bossed 112 can be repositioned such that the mounting holes 208 can align with the mounting bosses as shown in FIG. 3.

Figure 4:
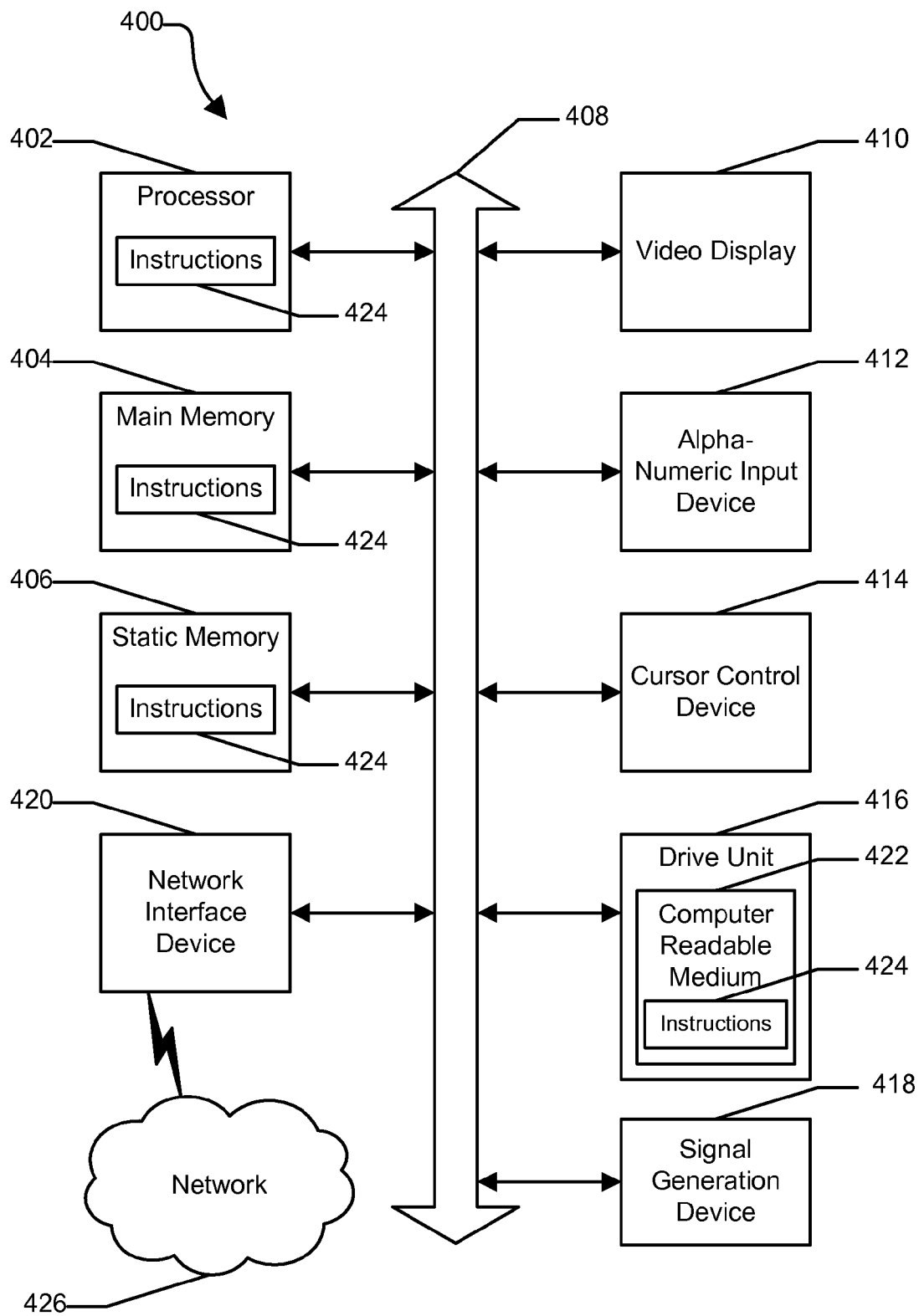
FIG. 4 is a block diagram of a general computer system.

FIG. 4 shows an illustrative embodiment of a general computer system 400 in accordance with at least one embodiment of the present disclosure. The computer system 400 can include a set of instructions that can be executed to cause the computer system to perform any one or more of the methods or computer based functions disclosed herein. The computer system 400 may operate as a standalone device or may be connected such as using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

The computer system 400 may include a processor 402 such as a central processing unit (CPU), a graphics processing unit (GPU), or both. Moreover, the computer system 400 can include a main memory 404 and a static memory 406 that can communicate with each other via a bus 408. As shown, the computer system 400 may further include a video display unit 410, such as a liquid crystal display (LCD), an organic light emitting diode (OLED), a flat panel display, a solid state display, or a cathode ray tube (CRT). Additionally, the computer system 400 may include an input device 412, such as a keyboard, and a cursor control device 414, such as a mouse. The computer system 400 can also include a disk drive unit 416, a signal generation device 418, such as a speaker or remote control, and a network interface device 420.

In a particular embodiment, as depicted in FIG. 4, the disk drive unit 416 may include a computer-readable medium 422 in which one or more sets of instructions 424 such as software, can be embedded. Further, the instructions 424 may embody one or more of the methods or logic as described herein. In a particular embodiment, the instructions 424 may reside completely, or at least partially, within the main memory 404, the static memory 406, and/or within the processor 402 during execution by the computer system 400. The main memory 404 and the processor 402 also may include computer-readable media. The network interface device 420 can provide connectivity to a network 426, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 424 or receives and executes instructions 424 responsive to a propagated signal, so that a device connected to a network 426 can communicate voice, video or data over the network 426. Further, the instructions 424 may be transmitted or received over the network 426 via the network interface device 420.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A system comprising:
   a minicard host connector configured to receive a minicard; and
   an open NAND flash interface host connector in physical contact with the minicard host connector and configured to receive an open NAND flash interface card, the open NAND flash interface host connector including:
      first and second retention arms extending from opposite ends of the open NAND flash interface host connector, the open NAND flash interface host connector being sufficiently wide for the minicard host connector to fit between the first and second retention arms; and
      a first solder tab extending downward along the minicard host connector and outward from the first retention arm, the first solder tab configured to secure the first retention arm to a motherboard and to provide a ground connection for the open NAND flash interface host connector, wherein the first solder tab is in physical contact with the minicard host connector.

2. The system of claim 1 wherein the open NAND flash interface host connector further comprises:
   a second solder tab extending downward and outward from the second retention arm, the second solder tab configured to secure the second retention arm to the motherboard and to provide the ground connection for the open NAND flash interface host connector.

3. The system of claim 1 wherein the open NAND flash interface host connector is sufficiently high enough that the open NAND flash interface card is above the minicard connector host when the open NAND flash interface card is connected to the open NAND flash interface host connector.

4. The system of claim 1 wherein a distance between the first and second retention arms is greater than 30 mm.

5. The system of claim 1 wherein a height of the open NAND flash interface host connector is greater than 4 mm.

6. An information handling system comprising:
   a motherboard;
   a minicard host connector in physical contact with the motherboard, the minicard host connector configured to receive a minicard, wherein the minicard includes a mounting hole, and the mounting hole is configured to connect to a mounting hole on the motherboard to secure the minicard to the motherboard; and
   an open NAND flash interface host connector in physical contact with the motherboard and configured to receive an open NAND flash interface card, the open NAND flash interface host connector including:
      first and second retention arms extending from opposite ends of the open NAND flash interface host connector, the open NAND flash interface host connector being sufficiently wide for the minicard host connector to fit between the first and second retention arms.

7. The system of claim 6 wherein the open NAND flash interface host connector further comprises:
   a first solder tab extending downward and outward from the first retention arm, the first solder tab configured to secure the first retention arm to a motherboard and to provide a ground connection for the open NAND flash interface host connector.

8. The system of claim 7 wherein the open NAND flash interface host connector further comprises:
   a second solder tab extending downward and outward from the second retention arm, the second solder tab configured to secure the second retention arm to the motherboard and to provide the ground connection for the open NAND flash interface host connector.

9. The system of claim 6 wherein the open NAND flash interface host connector is sufficiently high enough that the open NAND flash interface card is above the minicard connector host when the open NAND flash interface card is connected to the open NAND flash interface host connector.

10. The system of claim 6 wherein a distance between the first and second retention arms is greater than 30 mm.

11. The system of claim 6 wherein a height of the open NAND flash interface host connector is greater than 4 mm.

12. An information handling system comprising:
   a minicard;
   an open NAND flash interface card;
   a minicard host connector configured to receive the minicard; and
   an open NAND flash interface host connector in physical contact with the minicard host connector and configured to receive the open NAND flash interface card, the open NAND flash interface host connector including:
      first and second retention arms extending from opposite ends of the open NAND flash interface host connector, the open NAND flash interface host connector being sufficiently wide for the minicard host connector to fit between the first and second retention arms; and
      a first solder tab extending downward along the minicard host connector and outward from the first retention arm, the first solder configured to secure the first retention arm to a motherboard and to provide a ground connection for the open NAND flash interface host connector, wherein the first solder tab is in physical contact with the minicard host connector.

13. The system of claim 12 wherein the open NAND flash interface host connector further comprises:

a second solder tab extending downward and outward from the second retention arm, the second solder tab configured to secure the second retention arm to the motherboard and to provide the ground connection for the open NAND flash interface host connector.

14. The system of claim 12 wherein the open NAND flash interface host connector is sufficiently high enough that the open NAND flash interface card is above the minicard connector host when the open NAND flash interface card is connected to the open NAND flash interface host connector.

15. The system of claim 12 wherein a distance between the first and second retention arms is greater than 30 mm.

16. The system of claim 12 wherein a height of the open NAND flash interface host connector is greater than 4 mm.

17. The system of claim 12 wherein a length of the minicard is approximately 50.92 mm.

18. The system of claim 12 wherein a length of the minicard is approximately 26.8 mm.

\* \* \* \* \*